United States Patent [19]

Dodson, III

[11] 3,892,949

[45] July 1, 1975

[54] CIRCUIT FOR DETERMINING THE TIME OF TRANSITIONS IN AN ALTERNATING SIGNAL

[75] Inventor: George Bertram Dodson, III, Shirley, Mass.

[73] Assignee: RCA Corporation, New York, N.Y.

[22] Filed: Apr. 22, 1974

[21] Appl. No.: 462,771

[52] U.S. Cl. .......... 235/61.11 E; 250/566

[51] Int. Cl. .......... G06k 7/10; G08c 9/06

[58] Field of Search ... 235/61.11 E, 61.11 D, 153 AM, 235/153 AE; 360/33, 39, 40, 41, 42; 340/146.3 K, 146.1 BE, 146.1 R; 250/555, 566; 329/142, 104, 126; 307/231, 236

[56] References Cited

UNITED STATES PATENTS

| | | | |
|---|---|---|---|
| 3,244,986 | 4/1966 | Rumble | 329/126 |
| 3,496,462 | 2/1970 | Maniere et al. | 340/146.1 R |
| 3,737,632 | 6/1973 | Barnes | 329/104 |
| 3,780,270 | 12/1973 | Faulkner et al. | 235/61.11 E |
| 3,783,244 | 1/1974 | Kapsambelis | 235/61.11 E |

*Primary Examiner*—Daryl W. Cook
*Attorney, Agent, or Firm*—E. J. Norton; R. E. Smiley

[57] ABSTRACT

A circuit for detecting transitions in an alternating signal representing binary information where the signal exhibits other than sharp transitions from one level to the other and requires other than uniform time lapse to complete a transition. The signal is fed to circuitry for producing signals determining whether a transition is occurring and the polarity of the transition. Signals from the transition detecting circuit are clocked into two N bit registers at a rate substantially faster than the frequency of the alternating signal. Bits in ascending order in one register are compared with bits in decending order in the other register. When complete correspondence occurs, and when signals indicating a transition occur in preselected bit positions, a pulse is produced indicating a transition and indicating in effect the time that the transition occurs.

7 Claims, 5 Drawing Figures

CIRCUIT FOR DETERMINING THE TIME OF TRANSITIONS IN AN ALTERNATING SIGNAL

BACKGROUND OF THE INVENTION

It is often important in signal processing applications to detect the times at which an alternating signal changes from one value to another. Such a problem may occur with apparatus to optically scan labels, exhibiting along the scan path, two different alternating reflectivities, such as black and white. It is desired to know when the scanning apparatus passes from the scan of a region of one reflectivity to that of the other. If such a transition was manifested by a sharp change in signal level from the scanning apparatus, there would be no problem. However, since the scanning apparatus scans, at any one time, a finite region it will, at a transition time, be scanning an area containing both a black region and an adjoining white region, so that a sharp transition signal is not produced by the scanning apparatus. Still, it would not be difficult to determine when a transition occurred if the white and black regions, respectively, produced uniform reflectivities or if a transition occurred in a uniform time. Then, it would only be necessary to set a fixed threshold level of either time or voltage. Scan signal levels on one side of the threshold are considered white by definition, while scan signals on the other side of the threshold are considered black. Where, however, the white regions might not be pure white or the black regions pure black, a fixed threshold system is not suitable.

SUMMARY OF THE INVENTION

An alternating signal is applied to a first means which produces a first bit stream when the alternating signal is at a fixed value and produces a second different bit stream when the alternating signal is transitioning from one fixed value to another. A second means is responsive to the N bits most recently produced by the first means for comparing bit $i$ to bit N$-i$, and for producing a pulse when there is correspondence of the N bit pairs where N in a given integer if excess of the number of bits in the second bit stream and where $i = 1$ through N. A third means is responsive to the pulse indicating correspondence and is responsive to the presence of at least the minimum number of bits of the second bit stream needed to differentiate it from the first bit stream being present in the N most recently received bits for producing a pulse indicating that a transition in the alternating signal has occurred, the timing of the pulse being indicative of the time of occurrence of the transition.

DETAILED DESCRIPTION

Figure 1:
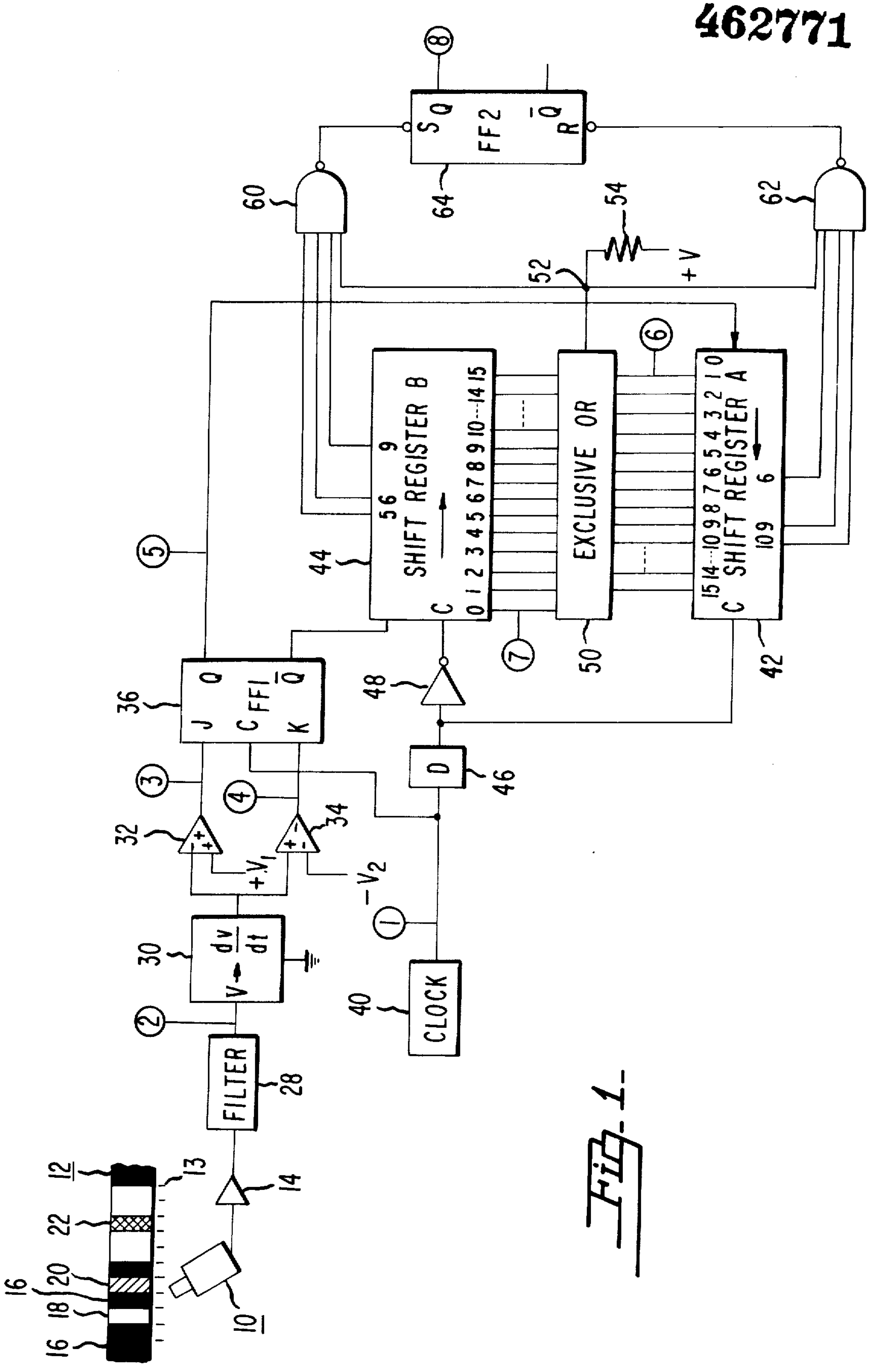
FIG. 1 is a block and schematic drawing of a signal transition detection circuit according to one embodiment of the invention.

In FIG. 1, an optical scanner 10 is adapted to serially scan at a constant rate a data pattern in binary form, such as 12. This pattern may be an optical pattern on a medium such as paper or some other recording medium. The scanner produces electrical signals, which are amplified by an amplifier 14, and which represent the reflectance of the portion of the medium being scanned. A typical scanner of this kind is illustrated and discussed in U.S. Pat. No. 3,622,758, issued to J. Schanne, and assigned to the same ssignee as the present invention. Scanner 10, as described herein is only a schematic representation.

The binary pattern 12 ideally is in only two colors, such as black 16 and white 18, exhibiting two different levels of reflectivity. Each area is some integral multiple of a unit width (including 1) along the path scanned by scanner 10. One unit width represents one bit. The tick lines 13 mark the boundaries between adjacent bits. At the constant rate at which the scanner 10 operates, the time required to scan the unit width is a known value chosen to be 800 nanoseconds (ns) in one working embodiment.

In practice, the pattern does not meet the ideal discussed above. Some areas 20 illustrated with diagonal lines may be soiled or smudged and exhibit less reflectivity than pure white areas 18. Other areas (one is shown at 22 as a cross-hatched pattern) may be misprinted, for example, so that they are lighter than the pure black areas 16 and therefore, exhibit a somewhat higher reflectivity than the theoretical zero reflectivity of a pure black area. Further, as the scanner 10 scans an area of finite width, the area being scanned at any instant in time may be one which includes regions of more than one level of reflectivity. Thus, waveform 2 (FIG. 2), which is substantially identical to the waveforms produced by amplifier 14 as the scanner scans the binary pattern 12, rather than being a steep sided two-level signal, is rounded and asymmetrical, requiring different times to transition from black to white or vice versa.

The output terminal of amplifier 14 is connected to a filter 28 for filtering out the frequencies appreciably above the desired frequencies contained in the signal produced by amplifier 14. Filter 28 is coupled to a voltage-to-voltage derivative ($dV/dt$) circuit 30, which may, for example, be a simple series RC circuit. Circuit 30 is referenced to some fixed voltage, such as earth ground. The output terminal of circuit 30 is coupled to the negative input terminal of a comparator 32, and the positive input terminal of a comparator 34. The positive terminal of comparator 32 is connected to some slightly positive voltage $V_1$, with respect to earth-ground, while the negative terminal of comparator 34 is connected to some slightly negative voltage $V_2$ relative to earth-ground. The comparators are wired such that both comparators produce relatively high voltages, such as +5 volts, when the scanner is scanning across a region of only one reflectivity, such as all white or all black. When the scanner 10 is transitioning from a black area 16 to a white area 18, for example, circuit 30 will produce positive going signals, causing comparator 32 to produce a relatively negative signal, such as 0 volts. Similarly, when scanner 10 is scanning from a white area, such as 18, to a black area, such as 16, circuit 30 will produce a negative going signal and comparator 34 will produce a relatively low voltage, such as 0 volts.

Comparators 32 and 34 are connected to the J and K terminals, respectively, of a JK flip-flop 36, hereafter referred to as FF1. A source of clock signals from a clock source 40 is coupled to the clock (C) terminal of FF1. Clock source 40 produces a square wave pulse having a frequency about 24 times that of the frequency of the signal at amplifier 14, or approximately 12 Megahertz in one working embodiment. The Q terminal of flip-flop 36 is coupled to an N bit shift register 42 hereafter referred to as shift register A, while the $\bar{Q}$ terminal is coupled to a second similar shift register 44, hereafter referred to as shift register B. In the embodiment having the alternating signal parameters previously stated, N is chosen to be 16. Such a value for N ensures that each register holds at least the number of bits equal to the number of clock pulses generated during a transition of the alternating signal from one value to the other. Each register holds less bits than the number of clock pulses generated between one alternating signal transition and the next.

Clock source 40 is coupled through a delay 46 to the clock input terminal of shift register A, and as inverted by inverter 48 to the clock terminal of shift register 44. As illustrated in FIG. 1, under control of signals from clock source 40, shift register A shifts data to the left on the leading edge of each positive going pulse from the clock, while shift register B shifts data to the right on the leading edge of each negative going pulse.

Each bit i from shift register A, and each bit $N-i$ from shift register B are coupled to an OR gate of an exclusive OR gate circuit 50. If $i$ ranges from 1 through 16, N=16. However, as illustrated in FIG. 1, since the bit locations are labeled 0 through 15, $i$ ranges from 0 through 15 and N = 15. For example, the contents of location zero, shift register A is compared to the contents of location 15, shift register B. The contents of location one, shift register A is compared with the contents of location 14, shift register B and so on.

Exclusive OR 50 is of the open collector type with all collectors connected together and connected to a terminal 52, which is biased to a positive voltage +V, such as +5 volts through resistor 54. Terminal 52, therefore, is at the positive voltage only when there is complete negative correlation between corresponding bits in register B and register A, and is at a relatively negative voltage under all other conditions. Thus, for example, if shift register A contains alternating 0's and 1's with a 0 located in location zero, while shift register B contains alternating 0's and 1's with a 1 in location 15, then the conditions in exclusive OR 50 would be such that terminal 52 would be high. It is of course, equally easy to construct a gate arrangement 50, which would produce one output only when there is positive correlation between corresponding inputs. Availability of components will influence the design choice.

Terminal 52 is coupled to one input of NAND gates 60 and 62, respectively. Shift register B locations 5, 6 and 9 are coupled to NAND gate 60, while locations 6, 9 and 10 in shift register A are coupled to NAND gate 62.

The output of NAND gate 60 is coupled to the set (S) terminal of a flip-flop 64, while the output terminal of NAND gate 62 is coupled to the reset (R) terminal of flip-flop 64, hereafter referred to as FF2. The Q and $\bar{Q}$ terminals of FF2 will produce signals digitally indicative of the data being scanned by scanner 10 and may be utilized by any suitable equipment, such as that described in the aforementioned patent to Schanne.

Figure 2:
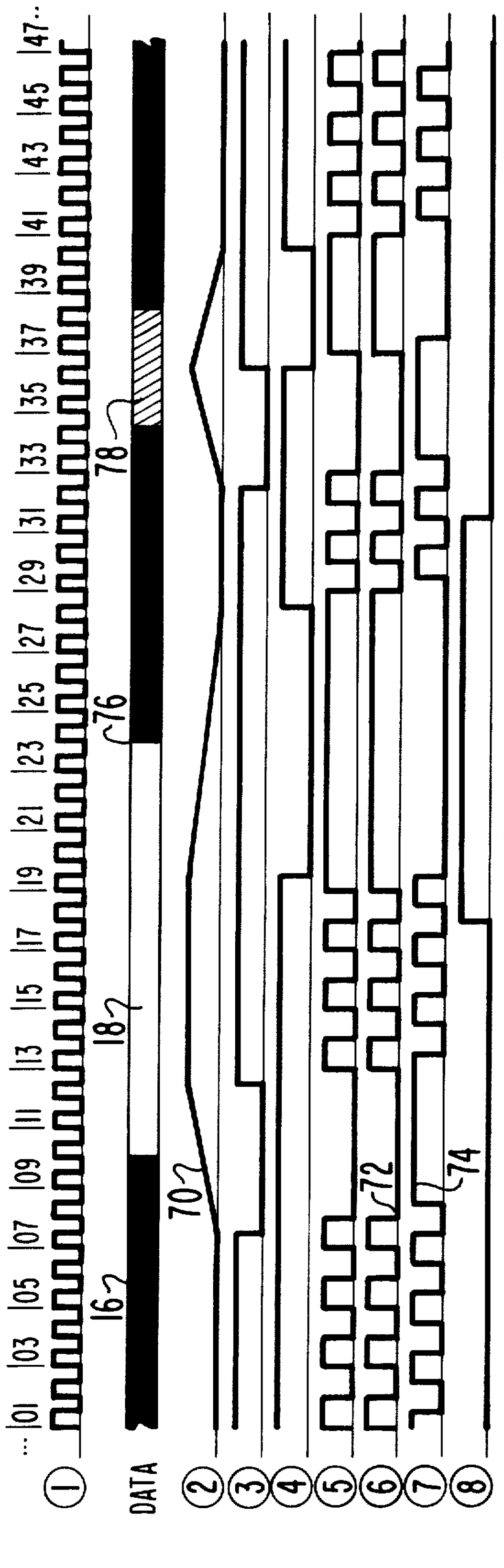
FIG. 2 is a drawing of waveforms useful for understanding the circuit of FIG. 1.

Operation of the circuit of FIG. 1 will be best understood by referring to the waveforms of FIG. 2, as appropriate. In FIG. 2, there are shown numbered waveforms at similarly labeled output terminals of the various components of FIG. 1, resulting from a scan across a small portion of binarily recorded data similar to that illustrated at 12, FIG. 1. Clock pulses are numbered (odd numbers only) merely for convenience in discussing the operation of the device.

Assuming for the moment that a scanner 10 is scanning over an all black portion 16 of data 12, amplifier 14, filter 28, and voltage derivative circuit 30 will all be producing constant voltage signals, the signal from the latter being at ground. It follows that comparators 32 and 34 will both produce high (1) signals. (A relatively high voltage signal will be termed a 1 by definition, while a relatively low voltage signal will be termed a 0.) Therefore, FF1 will toggle following the positive leading edge of each clock pulse from clock source 40 such that the Q terminal produces alternating 1's and 0's while the $\bar{Q}$ produces alternating 0's and 1's. Because of the small delay in delay 46, signals from from the Q terminal of FF1 will be settled before they are gated into location 0 of shift register A by clock pulses from clock source 40. One-half clock pulse later, the inverted pulse from the $\bar{Q}$ terminal of FF1 will be gated into location 0 of shift register B. Bits already in the shift registers are moved to the next higher numbered locations, as a new bit is shifted into location 0. After no more than 16 clock pulses register A will contain alternating 0's and 1's, while register B will contain alternating 1's and 0's. Therefore, exclusive OR 50 will produce a 1 which will prime NAND gates 60 and 62. Since no two consecutive bits are 1's, however, locations 9 and 10, register A, and locations 5 and 6, register B, cannot both contain 1's. It follows that neither NAND gate will be enabled.

Now assume that scanner 10 is scanning across the data illustrated in FIG. 2. Therefore, filter 28 will produce waveform 2, illustrated in FIG. 2. As scanner 10 scans from the first illustrated black area 16 to the first illustrated white area 18, filter output will transition from a relatively low value to a relatively high value over some finite time, as illustrated by region 70.

While the output of the filter is changing in the postive direction, voltage derivative circuit 30 will change from a 0 output voltage to some positive output voltage causing comparator 32 to change from a 1 output to a 0 output, as illustrated in waveform 3. The resulting 0 at the J terminal of FF1 will cause the Q terminal to go to a 0 as a result of clock pulse 08. As a result of the positive leading edge of clock pulse 08 delayed by delay 46, location 0 of register A will contain a 0 denoted by reference numeral 72, waveform 6. As a result of the negative going portion of clock pulse 08 (delayed), location 0 of register B will contain a 1 denoted by the reference numeral 74, waveform 7.

As long as filter 28 continues to produce a relatively positive going signal, comparator 32 will produce a 0. This continues until after the leading edge of clock pulse 12, but before the positive going leading edge of clock pulse 13. Therefore, as illustrated in FIG. 2, clock pulse 13 causes FF1 to toggle so the Q terminal is at a 1. Following the positive going leading edge of clock pulse 12, register A will contain five successive 0's. Following the negative going leading edge of clock pulse 12, register B will contain five successive 1's.

Figure 3:
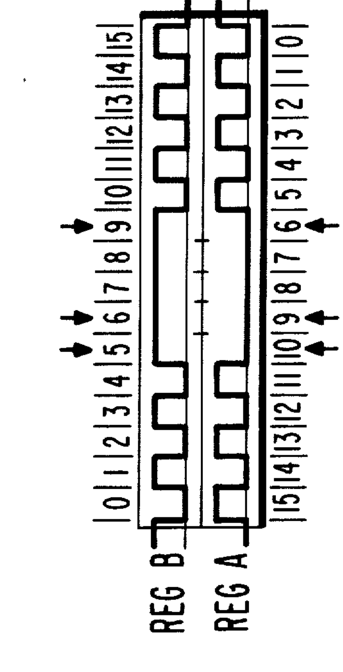
FIGS. 3–5 illustrate the contents of registers A and B at certain critical points in time.

The clock pulses following clock pulse 12 will continue to shift register A left and register B right (as illustrated in FIG. 1). Following the positive leading edge of clock pulse 18, registers A and B will be as illustrated in FIG. 3. Since each register A, location $i$ is of opposite polarity to register B, location, N–$i$, exclusive OR 50 will produce a 1 to prime NAND gates 60–62. Further, since all of locations 5, 6 and 9 register B are 1's, NAND gate 60 will be enabled. The resulting 0 sets FF2 so that the Q terminal produces a 1 indicative of a white portion of the label. FF2 was previously presumed to be set to a 0 indicative of a black area of data.

The 0 NAND gate 60 is indicative of three events. First, it is indicative of a transition from a black portion of data to a white portion of data. Second, it is indicative of the time of transition from one color to another. Third, it indicates the signal produced by filter 28 is not a noise pulse, but rather a valid signal indicative of a real shift in data value.

As to the first event a plurality of 1's in register B indicates a shift from black to white. When the data later changes from white to black, such as at reference numeral 76, a series of 1's will be entered into register A. Thereafter, when the pulses in registers A and B line up as illustrated in FIG. 3, register A will contain 1's in the center portion, causing NAND gate 62 to be enabled.

As to the second event the pulse will be produced by NAND gate 60 or 62 within ±½ clock pulse of a given number of clock pulses after the actual transition from one color to the other of the data, or in the illustrated embodiment between 7½ and 8½ pulses after the actual transition in the data occurs. Thus, while the signal indicating a transition is delayed in time from the actual transition, it is indicative of the actual time of transition within tolerance limits. Since all other logic, such as in the aforementioned patent to Schanne, is coupled to FF2, the multipulse delay makes no difference as a practical matter.

The reason for the ± tolerance is that FF1 may, for example, be already set to a 0 output when a 0 signal from comparator 32 directs it to produce a series of 0's. Alternately, as seen in FIG. 2, it may be set to produce a 1 when comparator 1 goes to a 0 output. The same thing may happen when the comparator goes from 0 to 1, indicating the end of a transition.

As to the third event, it is usually desired to require some minimum number of consecutive 1 or 0 bits, to differentiate a real change in data value from noise. In a practical embodiment, it has been found desirable to limit the minimum number of consecutive 0 or 1 bits to five. It can be shown that, if there are at least five consecutive bits of the same polarity, register A location 10 and register B location 5 will contain bits of the consecutive series, while four consecutive bits will occupy locations 6 through 9 in both registers A and B.

By requiring one odd and one even numbered location in the expected consecutive bit sequence to be coupled to NAND gates 60 and 62, it is possible to differentiate a transition from no transition, since with no transition it is impossible that an odd and an even location will be of the same polarity. Of course, if a tertiary, rather than a binary, system were to be used, then only a single location from each register may be coupled to the NAND gates.

Figure 5:
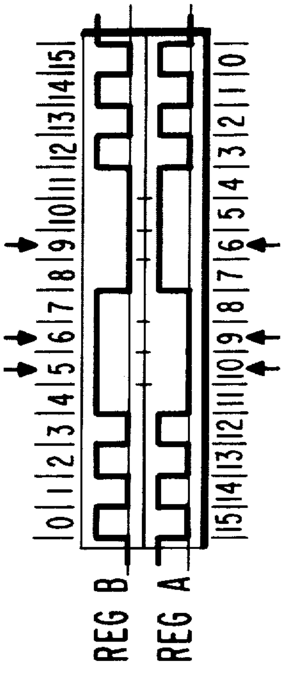

Yet, another location from each register is required to be coupled to the respective NAND gate, since noice could cause what appears to be a transition in one sense followed immediately by a transition in the other sense. Thus, in the data FIG. 2, reference numeral 78 may represent a misprint in the black ink which results in filter 28 producing a positive going signal followed immediately by a negative going signal. After an appropriate number of clock pulses, FIG. 5 illustrates the content of registers A and B. It will be noted that a check of only locations 9 and 10, register A, or 5 and 6, register B, will indicate valid data, which is not the case. By choosing any third location on the other side of the center of each register from that of the other two locations, but still within the locations occupied by five consecutive bits, this problem is solved.

As an alternative, it is possible to have one even location on one side of a center and one odd location on the other side of a center line, coupled to the NAND gate. For example, register A, locations 7 and 10, may be coupled to a NAND gate. The important point is that the number of locations, which must be coupled to a NAND gate, will depend on the type of protection to be afforded.

Figure 4:
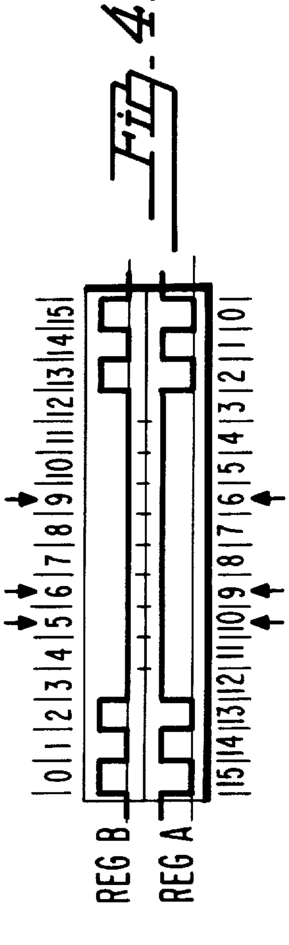

The number of bits of one polarity depend on a number of factors, as outlined at the beginning of this section. FIGS. 3 and 4, for example, illustrate transitions involving five and 10 bits of one polarity respectively, which are about the limits expected in the system outlined.

All of the circuits in FIG. 1 illustrated in block form, with the exception of voltage derivative circuit 30, are commerically available items in integrated form. As indicated previously, voltage derivative circuit 30 may merely be an RC circuit of appropriate value.

The various parameters given above are merely for purposes of illustration. The clock rate and the size of shift registers A and B will be dictated by the nature of the data.

What is claimed is:

1. In combination:

first means responsive to an alternating signal for producing a first stream of bits in response to said alternating signal being at a fixed value and for producing a second different stream of bits in response to said alternating signal transitioning from one fixed value to another fixed value, only one of said first and second bit streams being produced at any one time;

second means responsive to the N most recent bits of said bit streams produced by said first means, where N is a given integer in excess of the number of bits in said second bit stream, for comparing the $i$th bit with the $(N - i)$th bit, for $i = 1$ through N, and for producing a signal indicative of correspondence of the N bit pairs; and third means, responsive to said correspondence signal and responsive to the presence of at least the minimum number of bits of said second bit stream needed to differentiate it from said first bit stream being present in said N most recently received bits, for producing a pulse indicating that a transition in said alternating signal has occurred, the timing of the pulse being indicative of the time of occurrence of said transition.

2. The combination as set forth in claim 1, where said first means is responsive to said alternating signal transitioning from said another fixed value to said one fixed value for producing a third different stream of bits and where said third means includes means for distinguishing bits from said second stream from bits from said third bit stream for producing a signal indicative of the sense in which said alternating signal is changing.

3. The combination as set forth in claim 1, wherein said second means comprises first and second shift registers, each holding N bits and comparator means, each register responsive to the bit stream for storing the most recently received N bits, said comparator comparing the $i$th bit from said first register with the $(N-i)$th bit from said second register and producing a signal indicative of correspondence for each of the N bit pairs compared.

4. The combination as set forth in claim 3, wherein said third means comprises gate means.

5. The combination as set forth in claim 1, wherein said first means includes clock means producing uniformly spaced clocked signals at a frequency substantially greater than the frequency of said alternating signal and wherein a bit of said bit stream is produced as a result of the occurrence of each clock pulse.

6. An arrangement for detecting the times at which an alternating signal changes from a value on one side of a variable threshold level to a value on the other side of this threshold level, where the threshold level is dependent on the peak amplitude of the alternating signal comprising in combination:

first means responsive to said alternating signal for producing a first stream of bits when said alternating signal is at a peak in either sense, producing a second, different stream of bits when said alternating signal is transitioning from a peak in one sense to a peak in the opposite sense, and producing a third different stream of bits when said alternating signal is transitioning from a peak in said opposite sense to a peak in said first sense, no two of the bit streams occurring at the same time;

second means responsive to the N most recent bits of said bit streams produced by said first means where N is an integer in excess of the greater of the number of bits in said second or third bit stream, for comparing the $i$th bit with the $(N - i)$th bit for $i = 1$ through N and for producing a signal indicative of correspondence of each of the N bit pairs; and third means responsive to said correspondence signal and responsive to the presence of at least the minimum number of bits of either of said second bit stream and said third bit stream for differentiating that bit stream from the other bit streams for producing a signal indicating that a transition of said alternating signal has occured and the direction of the transition, the timing of the signal being indicative of the timing of the occurrence of said transition.

7. The combination as set forth in claim 6, further including optical scanning means responsive to a serial scan of a binary pattern of optically recorded information for producing said alternating signal having a value corresponding to the optical reflectivity of said pattern being scanned.

* * * * *